(12) United States Patent
Steger et al.

(10) Patent No.: US 6,602,456 B2
(45) Date of Patent: Aug. 5, 2003

(54) METHOD AND DEVICE FOR ACTUATING A PRESS

(75) Inventors: Rudy Steger, King City (CA); Daniel Meidan, Thornhill (CA)

(73) Assignee: Reena Corporation, Downsview (CA)

( * ) Notice: Subject to any disclaimer, the term of this patent is extended or adjusted under 35 U.S.C. 154(b) by 236 days.

(21) Appl. No.: 09/867,577

(22) Filed: May 31, 2001

(65) Prior Publication Data

US 2001/0024001 A1 Sep. 27, 2001

Related U.S. Application Data

(63) Continuation of application No. 09/298,830, filed on Apr. 26, 1999, now Pat. No. 6,261,085, which is a continuation-in-part of application No. 09/100,861, filed on Jun. 22, 1992, now abandoned.

(51) Int. Cl.[7] .............................................. B29C 45/67
(52) U.S. Cl. ............................. 264/328.1; 264/328.8; 425/588; 425/590; 425/451.2
(58) Field of Search ................................ 425/338, 588, 425/589, 590, 595, 450.1, 451.2, 451.9; 264/328.1, 328.8

(56) References Cited

U.S. PATENT DOCUMENTS

| 2,161,588 A | 6/1939 | Piperoux | 18/30 |
|---|---|---|---|
| 2,259,781 A | 10/1941 | Shaw et al. | 18/30 |
| 2,273,516 A | 2/1942 | Dinzl | 18/30 |
| 2,333,059 A | 10/1943 | Tucker | 18/30 |
| 2,555,476 A | 6/1951 | Du Bois et al. | 18/30 |
| 3,015,849 A | 1/1962 | Mittelstadt et al. | 18/30 |
| 3,642,407 A | 2/1972 | Fischbach | 425/242 |
| 3,669,593 A | 6/1972 | Cyriax | 425/186 |
| 4,021,181 A | 5/1977 | Hehl | 425/450.1 |
| 4,025,266 A | 5/1977 | Linde et al. | 425/589 |
| 4,090,837 A | 5/1978 | Balevski et al. | 425/588 |
| 4,105,385 A | 8/1978 | Hehl | 425/192 R |
| 4,111,629 A | 9/1978 | Nussbaumer | 425/450.1 |
| 4,571,169 A | 2/1986 | Shima et al. | 425/451.9 |
| 4,668,178 A | 5/1987 | Hehl | 425/589 |
| 4,747,982 A | 5/1988 | Nakatsukasa et al. | 264/40.5 |
| 4,753,592 A | 6/1988 | Kaaden | 425/588 |
| 4,867,938 A | 9/1989 | Schad et al. | 425/588 |
| 5,324,192 A | 6/1994 | Zakich | 425/588 |
| 5,714,180 A | 2/1998 | Lampl et al. | 425/589 |
| 5,902,611 A | 5/1999 | Stegmaier | 425/589 |
| 5,928,684 A | 7/1999 | Glaesener et al. | 425/589 |

*Primary Examiner*—James P. Mackey
(74) *Attorney, Agent, or Firm*—Dimock Stratton Clarizio; Mark B. Eisen

(57) ABSTRACT

An actuator for a press comprises a piston disposed through a small bore diameter high speed actuating cylinder, having a piston head disposed within the actuating cylinder and another piston head disposed within a larger bore diameter hydraulic clamping cylinder to apply the required clamping force to the press.

20 Claims, 12 Drawing Sheets

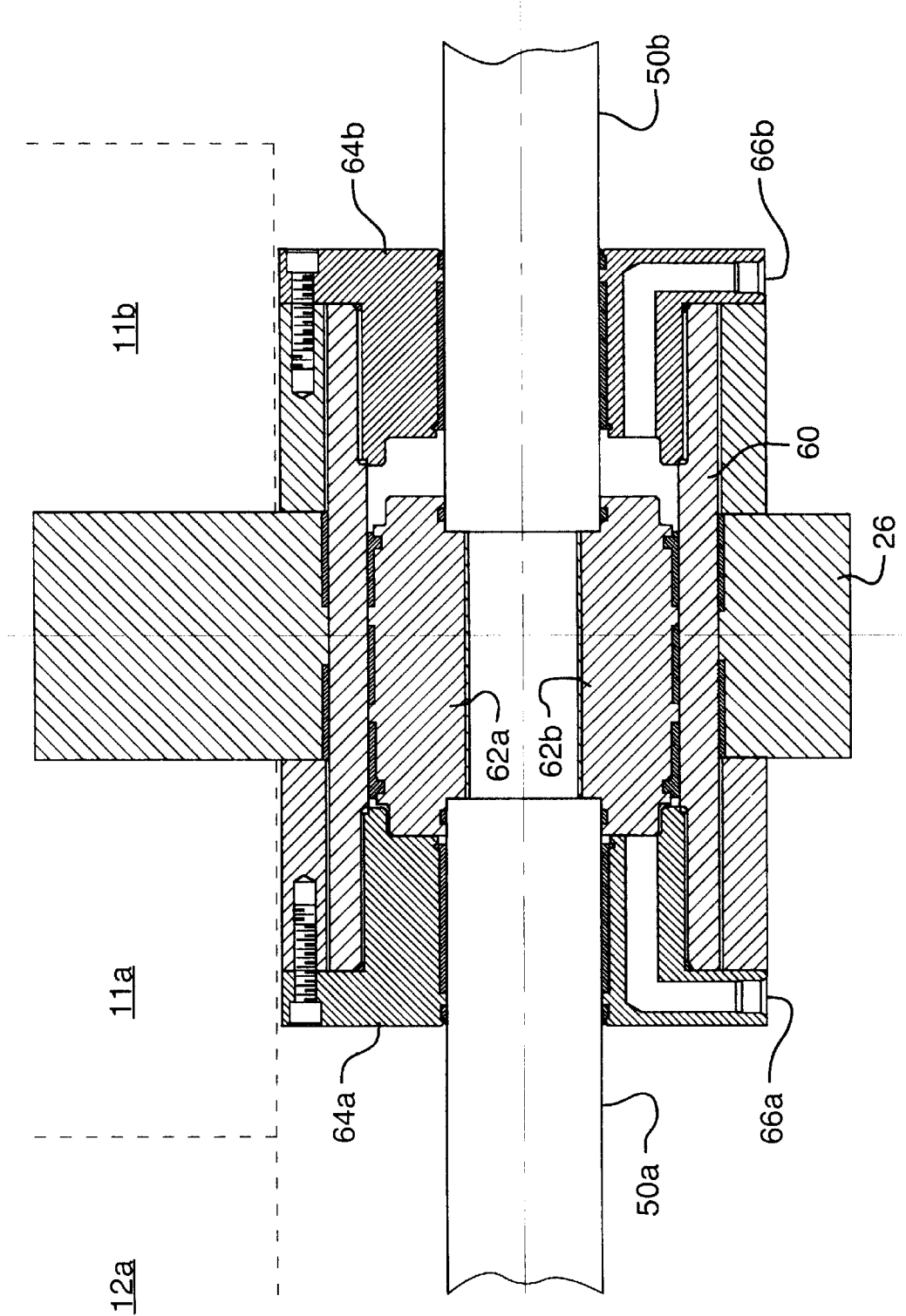

METHOD AND DEVICE FOR ACTUATING A PRESS

CROSS-REFERENCE TO RELATED APPLICATIONS

This application is a continuation of application Ser. No. 09/298,830 filed Apr. 26, 1999, now U.S. Pat. No. 6,261,085, which is a continuation-in-part of application Ser. No. 09/100,861 filed Jun. 22, 1998, abandoned.

FIELD OF INVENTION

This invention relates to presses. In particular, this invention relates to an actuator particularly suitable for use with an injection or extrusion molding press, and a method of clamping a press.

BACKGROUND OF THE INVENTION

Presses have many uses, one of the most popular being to clamp mold parts together in an injection molding apparatus. In a conventional injection molding apparatus a press section is disposed behind a plastic injection section. The press includes a moving platen which is forced toward a stationary platen by at least one actuator, usually a hydraulic cylinder mounted at the rear of the apparatus. The actuator bears against a stationary rear frame or "spider", which supports upper and lower pairs of guide bars that maintain the moving and stationary platens (and thus the mold parts) in precise alignment as the actuator forces the moving platen toward the stationary platen and into the clamping position.

Typically a hydraulic press is used in an injection molding apparatus, due to the very high forces required to properly clamp the mold parts together. In a conventional hydraulic actuator the hydraulic cylinder must be longer than the length of a full stroke of the piston and must be oriented in the direction of the stroke. Since the injection molding apparatus occupies the space in front of the press, the hydraulic cylinder is conventionally mounted to the rear of the press and thus a large clearance is required behind the operative clamping portion of the press in order to accommodate the cylinder.

Moreover, in a conventional hydraulic press the hydraulic cylinder serves the sole purpose of actuating the moving platen, and separate guide bars are used to maintain the moving and stationary platens in precise alignment. The use of separate structures for these purposes results in an expensive and heavy apparatus which makes poor use of available space. Also, the use of a heavy hydraulic cylinder capable of applying the necessary clamping force to both clamp and move the platen increases the weight and cost, and reduces the speed, of the apparatus.

It would accordingly be advantageous to provide a hydraulic press in which the actuating cylinders can be reduced in length and contained within the operative clamping section of the press, to significantly reduce the space requirements of the overall apparatus and thus allow plastics fabricators to utilize production facilities more efficiently.

It would also be advantageous to provide a press which combines the actuating and platen alignment functions of the press into the same structure, to reduce the weight and cost of the apparatus, and to provide an actuator which provides both actuating and clamping functions but without sacrificing speed or unduly increasing the cost and weight of the apparatus.

It would also be advantageous to provide a press that operates in two directions, taking advantage of the reciprocating motion of the actuator, to provide two injection molding cycles within a single press cycle.

SUMMARY OF THE INVENTION

The present invention overcomes these disadvantages and provides an economical, lightweight and compact press, and injection molding apparatus utilizing the press, incorporating an actuator which provides both actuating and clamping functions. The actuator of the invention may be used in virtually any application in which a clamping force is required, the actuator of the invention being particularly advantageously used with an injection molding press in an injection molding apparatus.

In one preferred embodiment the actuator is incorporated into a tandem press having a moving frame comprising a moving platen moving in a reciprocating motion between stationary outer platens. The moving platen moves on a track between a first clamping position in which the moving platen clamps a first mold mounted on one side of the press, and a second clamping position in which the moving platen clamps a second mold on the other side of the press. Because of the tandem design, as one mold is moved to a clamping position the other mold is being separated to remove a molded article. The tandem press of the invention thus provides two complete clamping cycles within one press cycle.

In the preferred embodiment an actuator according to the invention also serves as guide bars for maintaining the moving platen in alignment with the stationary platens. The tandem press of the invention thus avoids the need for separate guide bars by providing hydraulic actuating cylinders mounted on the stationary platens, the pistons for which serve both as guide bars to maintain alignment between the platens and as actuators to move the moving platen between clamping positions. In the preferred embodiment the actuating cylinders provide a relatively low force and operate at high speed, and the moving platen is provided with hydraulic clamping cylinders operating more slowly but with a relatively high force to apply the required clamping force to the mold after the actuating cylinders have moved the moving platen to the clamping position.

The present invention thus provides an actuator for actuating opposed first and second structures, the first and second structures being movable between an open position in which the first and second structures are spaced apart, and a closed position in which the first and second structures are disposed together, comprising: at least one hydraulic actuating cylinder mounted to the first structure, having an inner end facing the second structure and an outer end, at least one hydraulic clamping cylinder mounted to the second structure, a piston extending out of both ends of the actuating cylinder, having a first portion providing a piston head disposed within the actuating cylinder and a second portion providing a piston head disposed within the clamping cylinder, and a piston lock for anchoring the piston, whereby the actuating cylinder can be actuated to move the first and second structures from the open position to the closed position, and when the piston is anchored in the closed position the clamping cylinder can be actuated to apply a clamping force between the first and second structures.

In further aspects of the actuator of the invention: the clamping cylinder has a larger diameter than the actuating cylinder; the piston lock comprises an enlargement at portion of the piston projecting beyond the outer end of the actuating cylinder; the piston lock further comprises a spacer which in an anchoring position cooperates with the enlargement to substantially prevent the piston from extending toward the second structure; the first structure is stationary and the second structure is movable; the first structure comprises a stationary frame comprising at least one stationary platen having a working face, and the second structure comprises a moving frame comprising a moving platen disposed in alignment with the stationary platen and having a working face in opposition to the working face of the stationary platen, the movable platen being movable toward and away from the stationary platen and in a clamping position applying a clamping force between the working face of the stationary platen and the working face of the moving platen; the stationary frame comprises a first stationary platen having a working face and a second stationary platen having a working face disposed in opposition to the first stationary platen, each stationary platen and the moving frame comprises a moving platen disposed between the first and second stationary platens and in alignment therewith having a first working face in opposition to the working face of the first stationary platen and a second working face in opposition to the working face of the second stationary platen and movable between the first and second stationary platens so as to alternately apply a clamping force to the working face of the first stationary platen and to the working face of the second stationary platen in a clamping position; each stationary platen has mounted thereto a hydraulic actuating cylinder having open ends, wherein the actuator comprises a piston rod disposed through each of the actuating cylinders, each piston rod having a piston head disposed within the respective actuating cylinder and a piston head disposed within the clamping cylinder, an end of each piston extending out of the outer end of the respective actuating cylinder and comprising an enlargement for anchoring the piston rod in the clamping position, whereby actuating the clamping cylinder when the piston rod is anchored applies a clamping force between the moving platen and one of the stationary platens; the piston head disposed within the actuating cylinder comprises a bearing surface formed in the piston rod; the piston rods are engaged to the same piston head within the clamping cylinder; and/or a plurality of actuating cylinders are mounted about the stationary platen for respectively actuating a plurality of pistons disposed within the actuating cylinders and engaged to piston heads disposed within hydraulic clamping cylinders mounted to the moving platen.

The invention further provides a method of clamping opposed first and second structures movable between an open position in which the first and second structures are spaced apart and a closed position in which the first and second structures are disposed together, by a piston extending out of ends of an actuating cylinder mounted to the first structure and having a first portion providing a piston head disposed within the actuating cylinder and a second portion providing a piston head disposed within a clamping cylinder mounted to the second structure, the actuating cylinder having an inner end facing the second structure and an outer end, the method comprising the steps of: a. actuating the actuating cylinder to draw the second structure toward the first structure, b. anchoring the piston, and c. actuating the clamping cylinder to clamp the second structure to the first structure.

In further aspects of the method of the invention: the clamping cylinder has a larger diameter than the actuating cylinder; the piston is anchored by a piston lock comprising an enlargement at a portion of the piston projecting beyond the outer end of the actuating cylinder; the step of anchoring the piston further comprises the step of blocking movement of the enlargement to substantially prevent the piston from extending toward the second structure; the first structure is stationary and the second structure is movable; the first structure comprises a stationary frame comprising at least one stationary platen having a working face, and the second structure comprises a moving frame comprising a moving platen disposed in alignment with the stationary platen and having a working face in opposition to the working face of the stationary platen, the movable platen being movable toward and away from the stationary platen and in a clamping position applying a clamping force between the working face of the stationary platen and the working face of the moving platen; the stationary frame comprises a first stationary platen having a working face and a second stationary platen having a working face disposed in opposition to the first stationary platen, each stationary platen and the moving frame comprises a moving platen disposed between the first and second stationary platens and in alignment therewith having a first working face in opposition to the working face of the first stationary platen and a second working face in opposition to the working face of the second stationary platen and movable between the first and second stationary platens so as to alternately apply a clamping force to the working face of the first stationary platen and to the working face of the second stationary platen in a clamping position; the piston rods are engaged to the same piston head within the clamping cylinder; and/or a plurality of actuating cylinders are mounted about the stationary platen for respectively actuating a plurality of pistons disposed within the actuating cylinders and engaged to piston heads disposed within hydraulic clamping cylinders mounted to the moving platen.

BRIEF DESCRIPTION OF THE DRAWINGS

In drawings which illustrate by way of example only a preferred embodiment of the invention, FIG. 4 is a cross-section of a clamping cylinder in the press of FIG. 2.

DETAILED DESCRIPTION OF THE INVENTION

Figure 1:
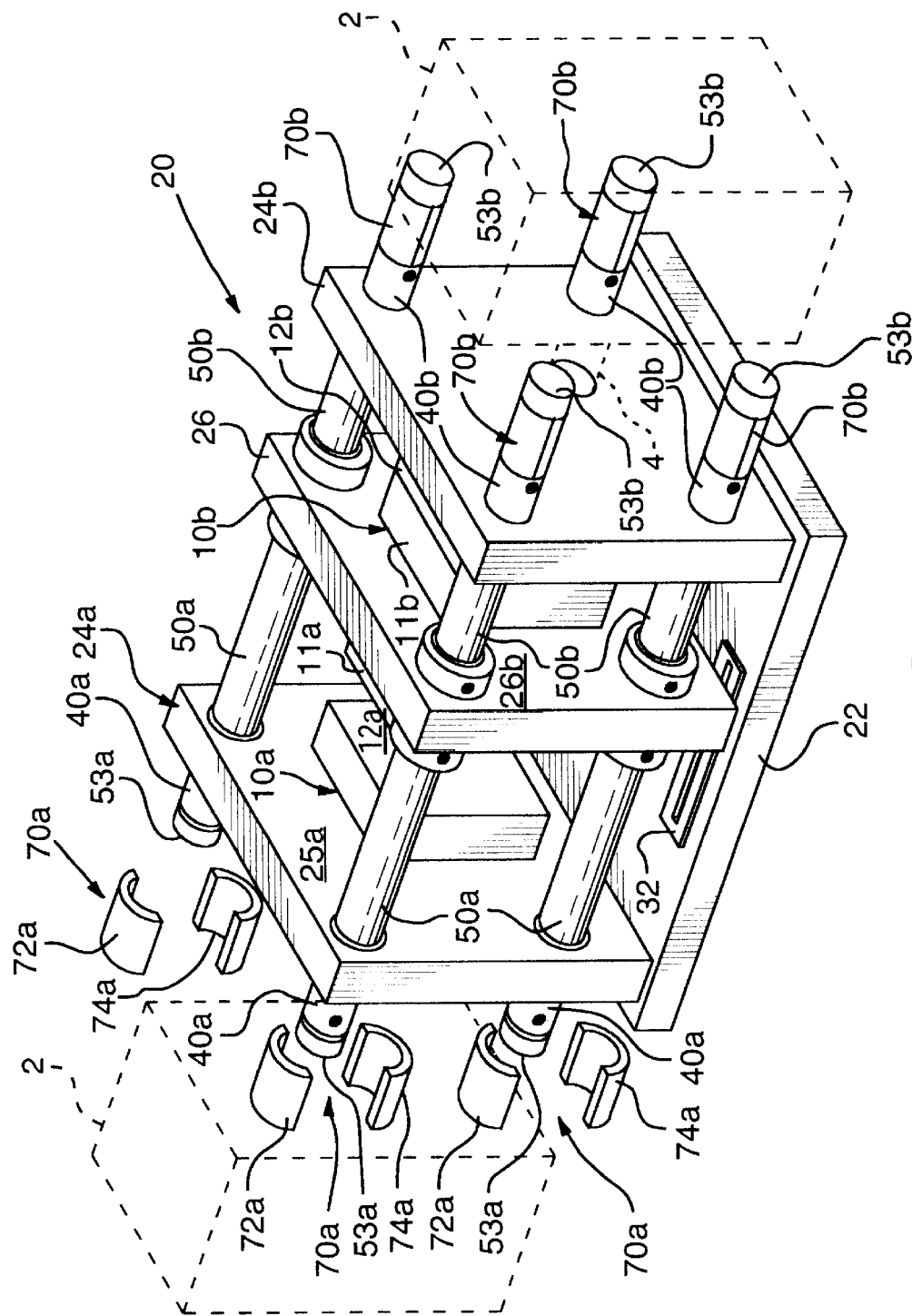
FIG. 1 is a perspective view of an injection molding apparatus embodying a hydraulic press utilizing an actuator of the invention.

FIG. 1 illustrates an injection molding apparatus utilizing a preferred embodiment of the press 20 of the invention. The injection molding units 2 shown in FIG. 1 are entirely conventional, having an injector pump (not shown) for pressurizing a molten thermoplastic material through a screw/runner 4 for injecting the molten thermoplastic into a mold, and an ejector pin and platen (not shown) for ejecting the molded article from the mold. The operation and structural details of the injection molding units 2 will be well known to those skilled in the art, and the invention is not intended to be limited to use with any particular type or configuration of injection molding unit 2.

The invention is illustrated in detail in FIGS. 1 to 5B. The actuator of the invention is described in relation to a hydraulic press 20, which provides certain advantages that will become apparent from the description below. However, it will be appreciated by those skilled in the art that the actuator of the invention may also be used in other clamping applications.

The actuator of the invention will be described in the environment of the preferred embodiment of the press 20 illustrated, which is preferably supported on a base or pad 22, and includes a stationary frame and a moving frame. The press 20 is preferably laterally symmetrical and provides two molds 10a, 10b each respectively comprising mold parts 11a, 12a and 11b, 12b. Mold 10a is mounted into one side of the press 20, and mold 10b is mounted into the other side of the press 20. An injection molding apparatus 2 (shown schematically in phantom lines in FIG. 1) is preferably disposed at each end of the press 20 to inject plastic into the molds 10a, 10b in conventional fashion. It will be appreciated that the press 20 of the invention could also be operated with a single injection molding apparatus operating with a single mold 10a or 10b, however there are benefits to operating the press 20 in tandem fashion to obtain two clamping cycles (i.e. injection molding cycles) within a single press cycle as described in the preferred embodiment.

The stationary frame comprises a first stationary platen 24a having a working face 25a and a second stationary platen 24b having a working face 25b disposed in opposition to the working face 25a. The moving frame comprises a moving platen 26 disposed between the stationary outer platens 24a, 24b, having a first working face 26a and a second working face 26b on the opposite side thereof. The moving platen 26 is mounted on a track 32 and moves between two clamping positions, a first clamping position in which the moving platen 26 compressively clamps mold part 11a mounted on face 26a of the moving platen 26 against a mating mold part 12a mounted on the working face 25a of the first stationary platen 24a, and a second clamping position in which the moving platen 26 compressively clamps mold part 11b mounted on the opposite face 26b of the moving platen 26 against mating mold part 12b mounted on the working face 25b of the second stationary platen 24b. Because of the tandem design, as the mold part 11b is moved toward a clamping position against mold part 12b mold part 11a is separated from mold part 12a, and vice versa. In the preferred embodiment the press 20 thus provides two complete clamping cycles in one press cycle.

In the preferred embodiment the actuator of the invention comprises at least one piston having a piston head disposed in an actuating cylinder and another piston head disposed in a clamping cylinder, as hereinafter described.

In the tandem press 20 illustrated, hydraulic pistons 50a, 50b are respectively actuated by hydraulic cylinders 40a, 40b, which serve to transfer the actuating force of the hydraulic fluid to the moving platen 26. The pistons 50a also act as guide bars to maintain the platens 24a and 26 in alignment during the process of clamping mold parts 11a and 12a; likewise, the pistons 50b act as guide bars to maintain the platens 24b and 26 in alignment during the process of clamping mold parts 11b and 12b.

In the preferred embodiment, to the outer face of each stationary platen 24a, 24b are respectively mounted four hydraulic cylinders 40a, 40b, preferably generally evenly spaced about the axial center of the press 20. The cylinders 40a, 40b are bolted to the stationary platens 24a, 24b as by bolts 41. Each cylinder 40a, 40b has a length slightly greater than the stroke length of the pistons 50a, 50b, as defined by the length of the path of travel of the moving platen 26 along the track 32.

The hydraulic actuating cylinders 40a, 40b are provided at each end with an inner and outer head assembly 42a, 44a and 42b, 44b, respectively, provided with suitable bearings and seals. The outer head assembly 44a or 44b provides an hydraulic port 46a or 46b for pumping hydraulic fluid into and out of the cylinders 40a, 40b. The piston 50a or 50b is slidably mounted within each cylinder 40a or 40b, respectively. (For ease of reference like parts on each side of the press 20 are referred to herein using like reference numerals, with the suffix "a" to designate parts on the side of the press 20 containing mold 10a, shown at the left in the drawings, and with the suffix "b" to designate parts on the side of the press 20 containing mold 10b, shown at the right in the drawings.)

Figure 2:
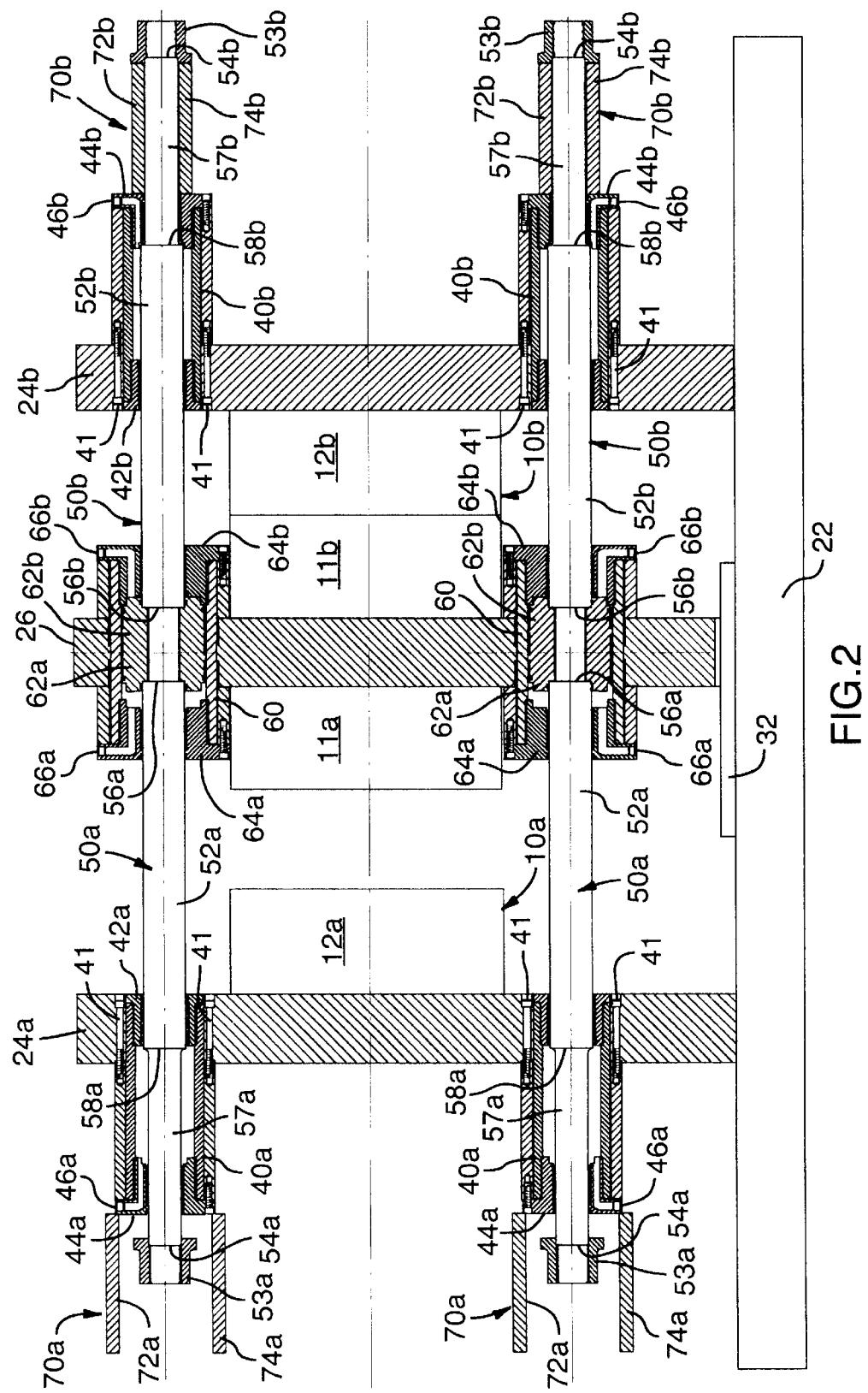
FIG. 2 is a cross-sectional elevation of the press using the actuator of the invention illustrated in the injection molding apparatus of FIG. 1, FIGS. 3A to 3F are cross-sectional elevations of the press of FIG. 2 showing the stages of operation of the press section.
Figure 3A:
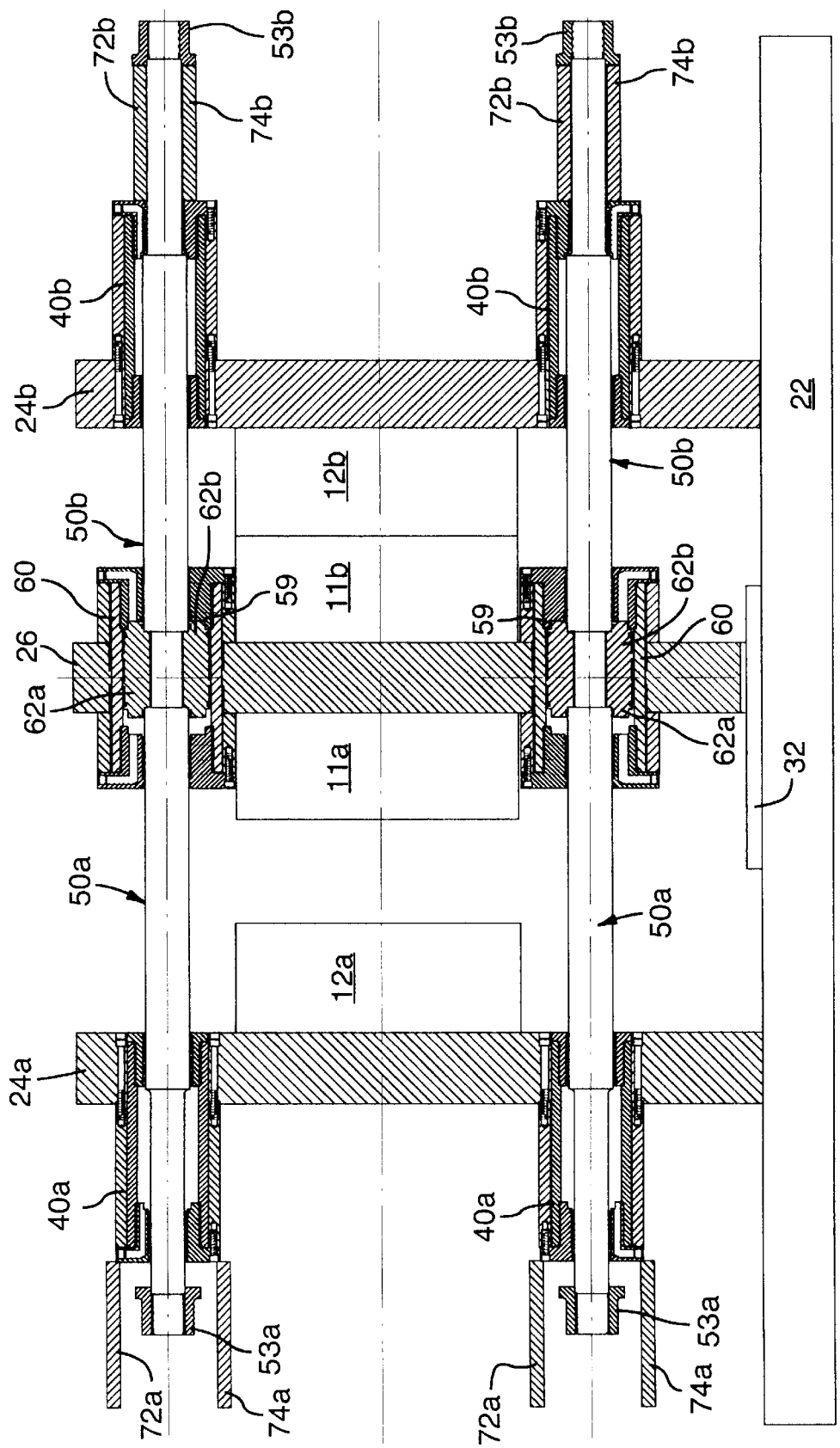

Each piston 50a comprises a piston rod 52a which extends out of the outer head assembly 44a to an outer end 54a, and extends through the inner head assembly 42a to a clamping end 56a which is secured to the moving platen 26 in the manner hereinafter described. The hydraulic head assemblies 42a and 44a retain hydraulic fluid within the cylinder 40a while the piston rod 52a slides through the cylinder 40a to actuate the moving platen 26. The pistons 50a thus move between a retracted position in which the mold 10a is closed and the mold 10b is fully open, and an extended position in which the mold 10b is closed and the mold 10a is fully open as shown in FIGS. 2 and 3A.

Likewise, each piston 50b comprises a piston rod 52b extends out of the outer head assembly 44b to an outer end 54b, and extends through the inner head assembly 42b to a clamping end 56b which is secured to the moving platen 26 in the manner hereinafter described. The pistons 50b thus move between a retracted position in which the mold 10b is closed and the mold 10a is fully open, and an extended position in which the mold 10a is closed and the mold 10b is fully open as shown in FIG. 3E.

The moving platen 26 is thus actuated along a path of travel defined by the track 32 by the piston rods 52a, 52b, which in turn are driven by hydraulic fluid pumped into and out of the hydraulic actuating cylinders 40a, 40b during a press cycle. In the preferred embodiment each of the piston rods 52a, 52b respectively comprises a constricted portion 57a, 57b which provides a bearing surface 58a, 58b where the diameter of the piston rod 52a, 52b increases. The bearing surface 58a or 58b is disposed within the respective hydraulic cylinder 40a or 40b and acts as a piston head; as hydraulic fluid is pumped into the cylinder 40a or 40b the pressure on the bearing surface 58a or 58b displaces the respective piston rod 52a or 52b toward the moving platen 26.

This avoids the need for a separate piston head within the cylinder 40a or 40b, with attendant cost advantages, and is sufficient for the relatively low driving force required to move the moving platen 26 to the clamping position. In the preferred embodiment a much higher clamping force required is provided by hydraulic clamping cylinders 60, described below. If the press 20 were actuated and clamped solely by the hydraulic actuating cylinders 40a, 40b, the cylinders 40a, 40b would have to operate at the higher clamping force required to clamp the molds 10a, 10b; in this case the piston rods 52a, 52b could each be provided with a larger piston head disposed within the actuating cylinders 40a, 40b to provide the required clamping force, however the duration of the press cycle would be considerably increased.

As noted above, in the preferred embodiment the hydraulic actuating cylinders 40a, 40b are small bore diameter high speed cylinders that are used only to move the moving platen 26 to the clamping positions. The clamping force is supplied by hydraulic clamping cylinders 60 mounted on the moving platen 26, which have a relatively larger bore diameter and thus provide a higher force than the actuating cylinders 40a, 40b. The inner ends 56a, 56b of the piston rods 52a, 52b are disposed through sealing flanges 64a, 64b and affixed to piston heads 62a, 62b which may be secured together (or formed as a single piston head 62) slidably contained within the cylinder 60. The purpose of the cylinders 60 is to apply a high clamping force between the mold parts 11a, 12a or 11b, 12b in the final stage of the clamping cycle, and thus the clamping cylinders 60 are provided with a larger cross-section than the actuating cylinders 40a, 40b, and the piston heads 62a, 62b provide a commensurately larger surface area against which the hydraulic fluid acts to produce the greater clamping force. The cylinder 60 is mounted into the moving platen 26 and provides hydraulic ports 66a, 66b, respectively, for alternately actuating the piston heads 62a, 62b as the moving platen 26 reaches the alternate clamping positions.

A piston lock is provided to anchor the pistons 50a, 50b in preparation for clamping. In the preferred embodiment the outer end of each hydraulic actuating cylinder 40a or 40b is provided with a movable spacer, in the preferred embodiment an anchoring yoke 70a or 70b, the purpose of which is to anchor the pistons 50a, 50b into the retracted position during the final stage of a clamping cycle. The outer ends 54a, 54b of the piston rods 52a, 52b are provided with an enlargement, for example anchoring caps 53a, 53b threadedly engaged to the outer ends 54a, 54b of the piston rods 52a, 52b as in the embodiment shown.

Figure 5A:
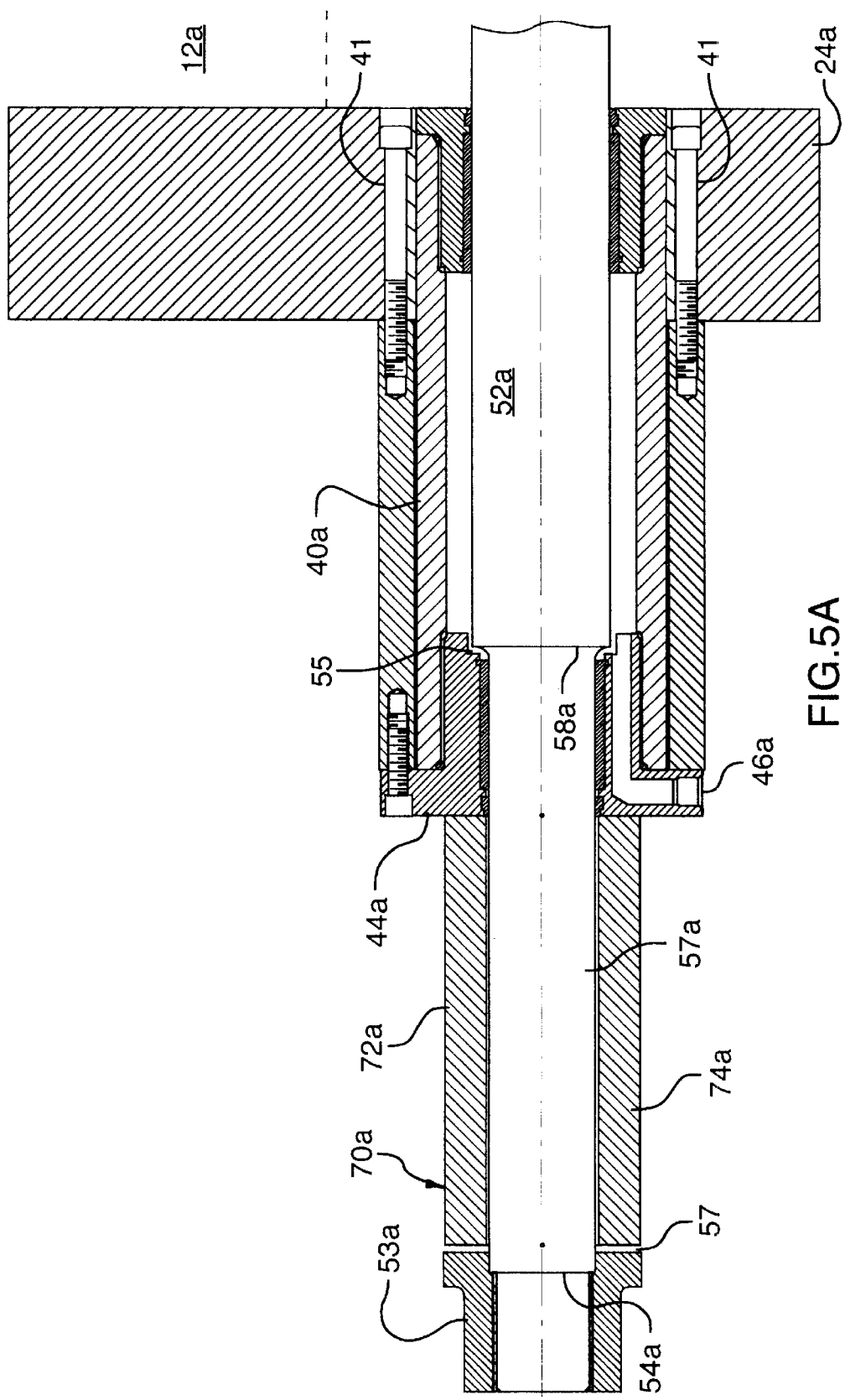
FIG. 5A is a cross-section of piston lock in the press of FIG. 2 showing the lock in the anchoring position.
Figure 5B:
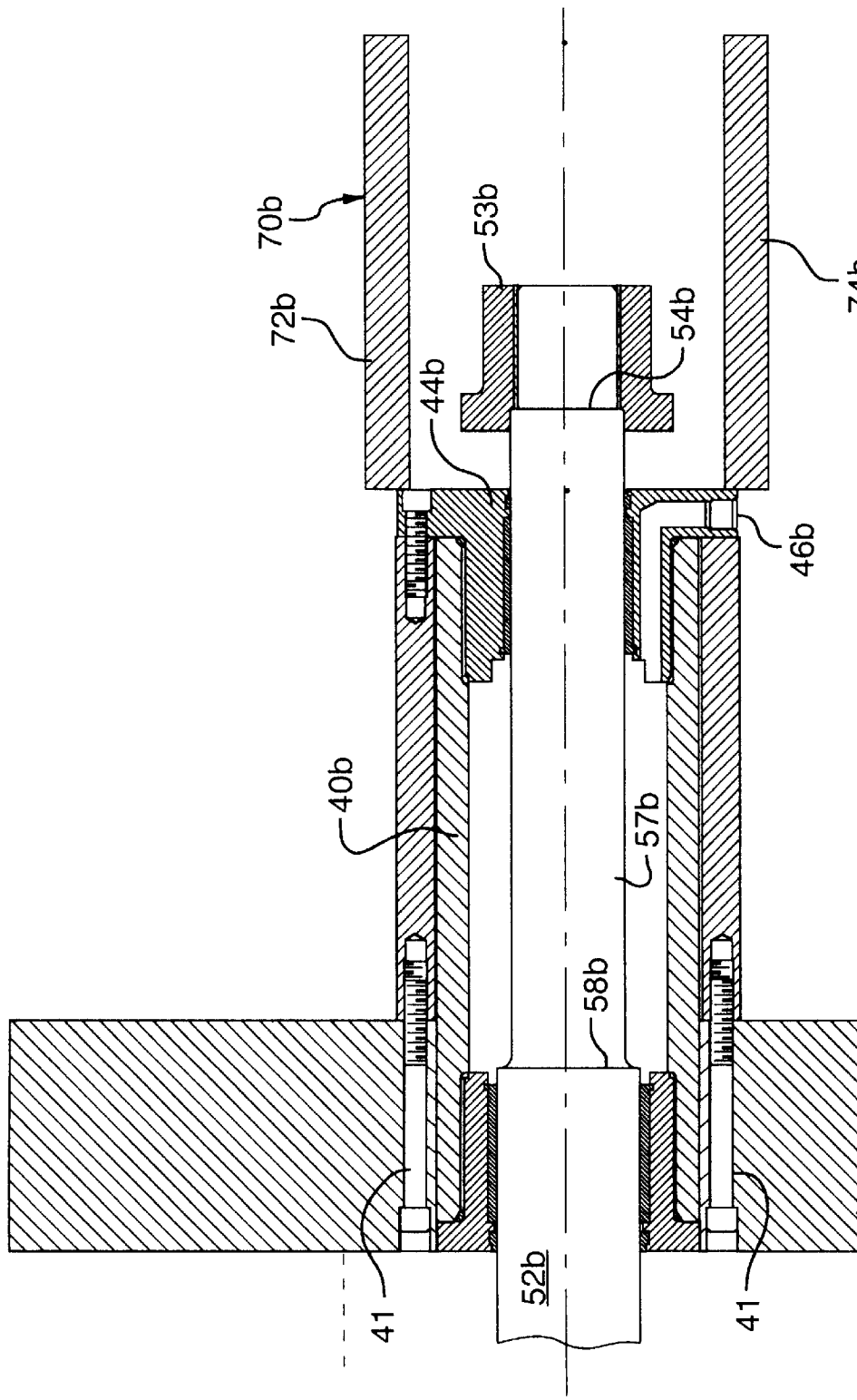
FIG. 5B is a cross-section of piston lock in the press of FIG. 2 showing the lock in the release position.
Figure 6:
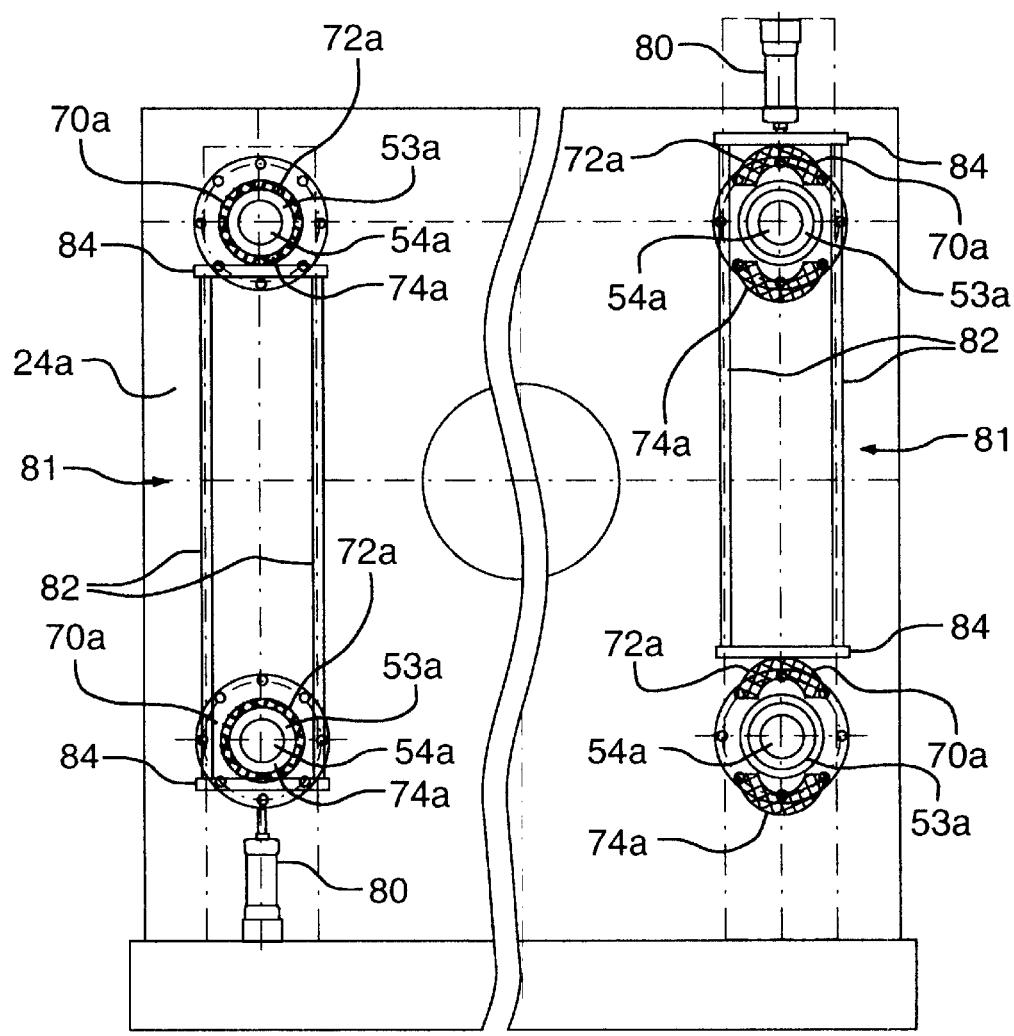
FIG. 6 is a an end elevation showing one preferred manner of actuating the anchoring yokes of the piston lock.

The yokes 70a, 70b each preferably comprise curved or hemi-cylindrical portions 72a, 74a and 72b, 74b, respectively, which are actuated by any suitable actuator 80 such as a solenoid, or by any other suitable alternative such as a motor, pneumatic or hydraulic actuator or the like. In the preferred embodiment the actuator 80 actuates a reciprocating frame 81 comprising connecting rods 82 joined by crossbars 84, as shown in FIG. 6 (the actuator 80 and frame 81 have been omitted from FIGS. 1 to 5 for clarity). The frame 81 moves the yokes 70a, 70b between an anchoring position in which the yoke 70a or 70b is engaged about the piston rod 52a or 52b, respectively, and thus impinges into the path of the anchoring cap 53a or 53b to serve as a spacer which maintains the anchoring cap 53a or 53b at a fixed spacing from the hydraulic actuating cylinder 40a or 40b to anchor the piston 50a or 50b in the retracted position; and a release position in which the yoke 70a or 70b is released from the piston rod 52a or 52b and the anchoring cap 53a or 53b is free to move toward the hydraulic cylinder 40a or 40b so that the piston 50a or 50b can be driven to the extended position. For example, on the left-hand side of FIG. 6 the yokes 70a are shown in the anchoring position and on the right-hand side of FIG. 6 the yokes 70a are shown in the release position.

It will be appreciated that although the releasable spacer in the preferred embodiment comprises a yoke 70a or 70b, the spacer functions to anchor the piston 50a or 50b by spacing the anchoring cap 53a or 53b from the cylinder 40a or 40b, respectively, and this can be accomplished by any other suitable means. Further, the manner in which yokes 70a, 70b are moved between the anchoring position and the release position can be achieved many other ways, and the invention is not intended to be limited in this respect.

The operation of the tandem embodiment of the press 20 of the invention will now be described with reference to the preferred embodiment illustrated, and particularly FIGS. 3A to 3F which show the various stages in one complete press cycle (two clamping cycles).

FIG. 3A shows the press 20 with the mold 10b in a fully clamped condition and the mold 10a in a fully separated condition. The clamping cylinders 60 are fully actuated to apply pressure against piston head 62b, and thus tension the piston 50b to provide the required clamping force between mold parts 11b and 12b. A previously molded plastic article is being removed from separated mold parts 11a and 12a.

Figure 3B:
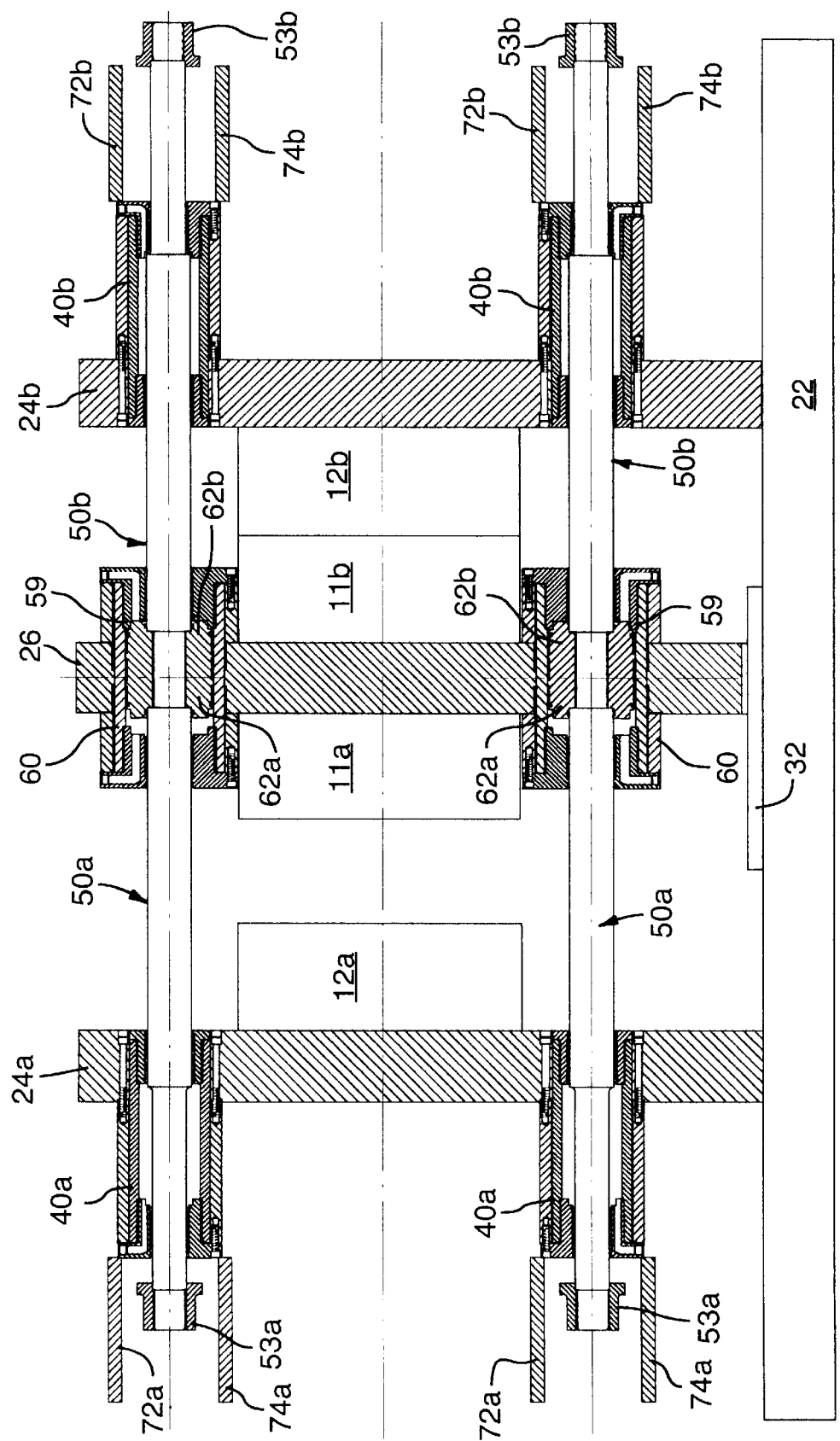
Figure 3C:
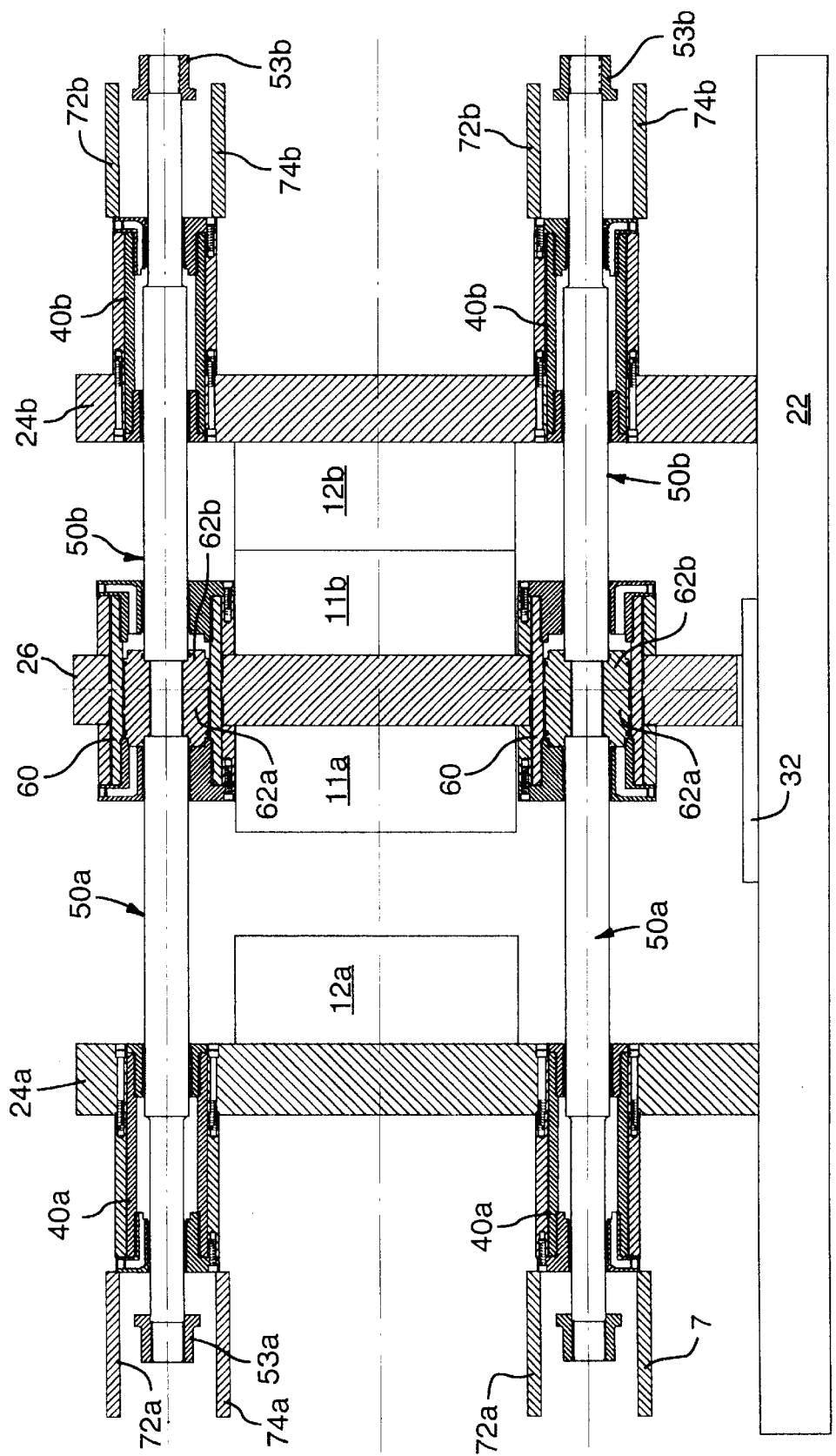

To separate the mold parts 11b, 12b and begin the clamping cycle for the mold parts 11a, 12a, hydraulic pressure is released from the ports 66b of the clamping cylinders 60 to release the clamping force from the mold 10b, which in turn releases the tension on the piston 50b, and the anchoring yokes 70b are released to free the outer ends 54b of the pistons 50b, as shown in FIG. 3B. Hydraulic fluid is pumped into the ports 46b of actuating cylinders 40b, and as the hydraulic fluid intrudes into the gap 55 between the bearing surface 58b and the head assembly 44b of each piston rod 52b (as best seen in FIG. 5A), the piston rods 52b are forced out of the cylinders 40b toward the stationary platen 24a, as shown in FIG. 3C.

Figure 3D:
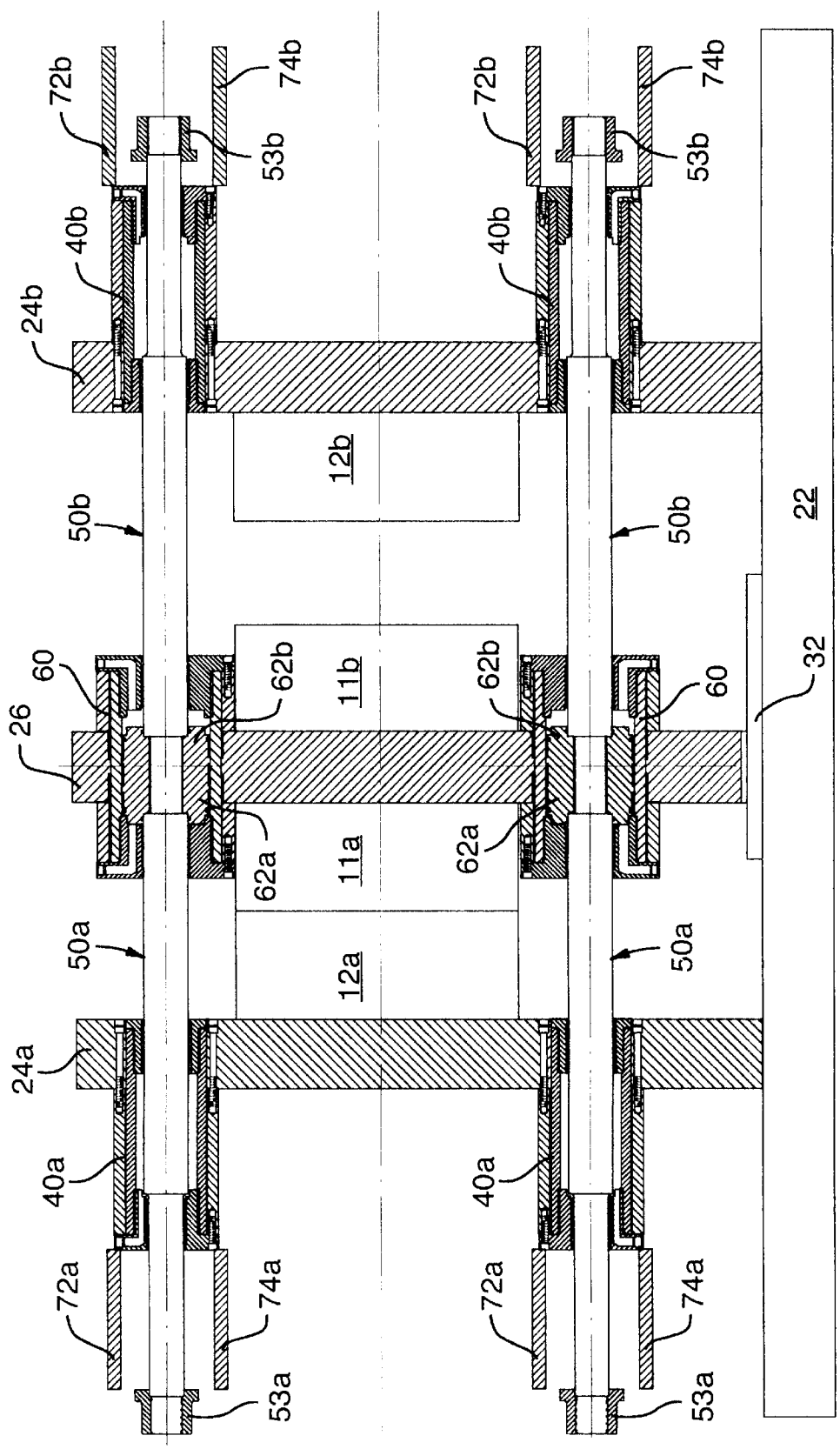
Figure 3E:
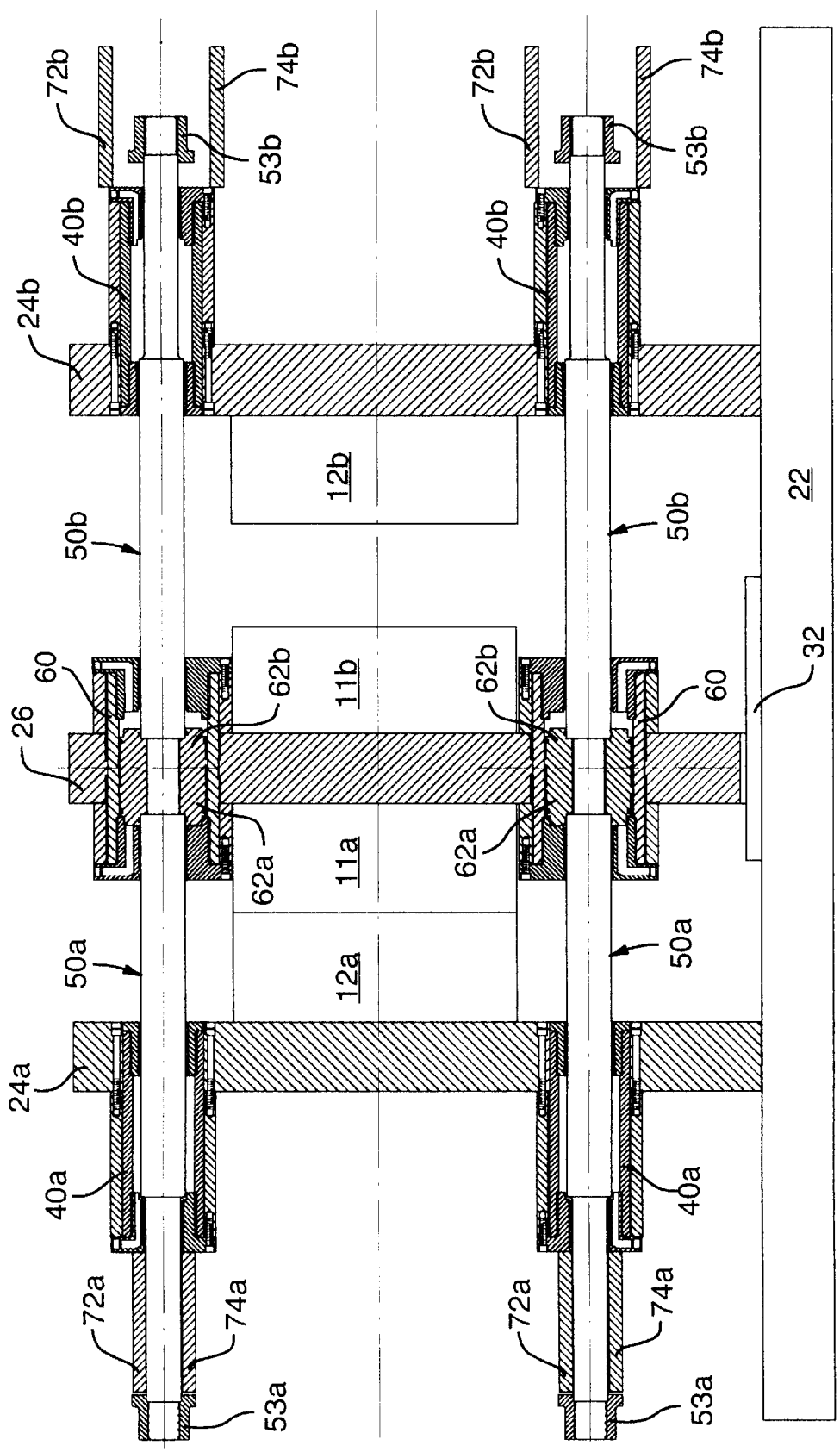

At first the piston heads 62a, 62b are forced to the opposite side of the clamping cylinder 60. As hydraulic fluid continues to be pumped into the ports 46b the pistons 50b are driven to the extended position, and the piston head 62a in contact with the end of the clamping cylinder 60 forces the moving platen 26 away from the stationary platen 24b and toward the stationary platen 24a to the clamping position, as shown in FIG. 3D. This simultaneously separates the mold parts 11b, 12b and closes the mold parts 11a, 12a, and forces the pistons 50a to retract into the cylinders 40a.

The yokes 70a are then closed to the anchoring position, as shown in FIG. 3E. This spaces the anchoring caps 53a from the actuating cylinders 40a to anchor the outer ends 54a of the pistons 50a. In the preferred embodiment, the anchoring caps 53a are spaced slightly from the yokes 70a at this stage (see gap 57 in FIG. 5A), so that the yokes 70a have room to close between the anchoring cap 53a and the cylinder 40a.

Figure 3F:
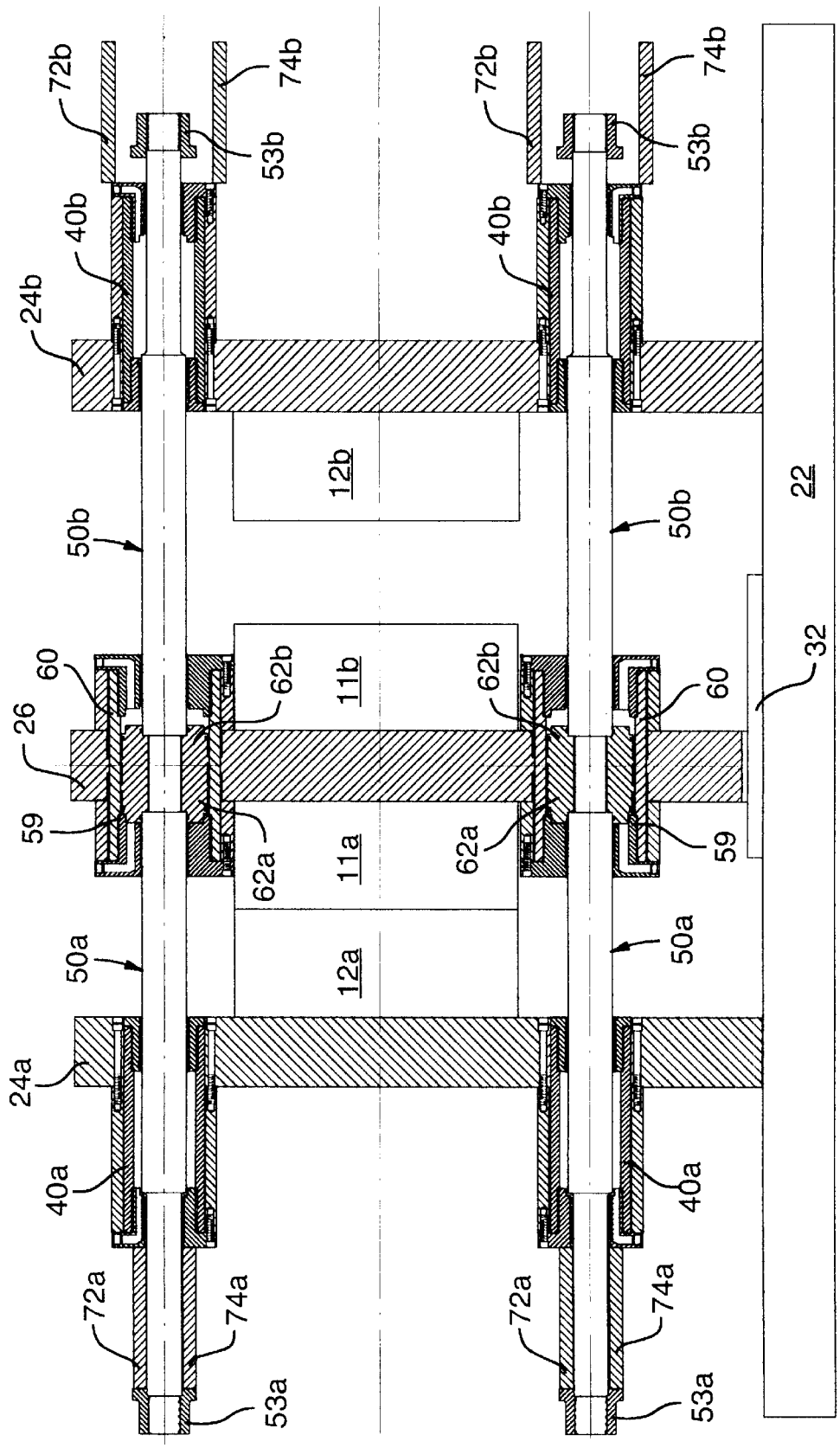

Hydraulic fluid is then pumped into the ports 66a, drawing the anchoring caps 53a snugly against the yokes 70a, which in the anchoring position prevent any substantial extension of the piston rods 52a. This is shown in FIG. 3F, in which the anchoring cap 53a has been drawn fully against the yoke 70a and a small gap 59 can now be seen between the clamping cylinder 60 and the piston head 62a. Since the anchoring caps 53a prevent the piston rods 52a from extending out of the cylinders 40a, so the piston heads 62a are effectively rendered stationary, as hydraulic fluid continues to be pumped into ports 64a the clamping cylinders 60 are forced toward the stationary platen 24a; since the clamping cylinders 60 are mounted in the moving platen 26, the moving platen is forced toward the stationary platen 24a to thus apply the clamping force to the mold 10a.

The mold 10a is now in the fully clamped position and the mold 24b is in the fully separated position. A molded plastic article is removed from separated mold parts 11b and 12b.

To reverse the press 20 the steps described above are repeated in the same order but in relation to the counterpart components on the other side of the press 20: To separate the mold parts 11a, 12a and begin the clamping cycle for the mold parts 11b, 12b, hydraulic pressure is released from the ports 64a of the clamping cylinders 60, releasing the clamping force from the mold 10a, and the anchoring yokes 70a are released from the outer end 54a of each piston 50a. Hydraulic fluid is pumped into the ports 46a of actuating cylinders 40a, first forcing the piston heads 62a, 62b toward the stationary platen 24b as the piston rods 52a are forced out of the cylinders 40a, and ultimately driving the moving platen 26 away from the stationary platen 24a and toward the stationary platen 24b to the clamping position. This simultaneously separates the mold parts 11a, 12a and closes the mold parts 11b, 12b, and retracts the pistons 50b into the cylinders 40b. The yokes 70b are closed to the anchoring position, anchoring the outer ends 54b of the pistons 50b. Hydraulic fluid is then pumped into the ports 66b in the clamping cylinders 60, drawing the anchoring caps 53b snugly against the yokes 70b and then, as the piston heads 62a, 62b can no longer move laterally, forcing the cylinders 60 and thus the moving platen 26 toward the stationary platen 24a to the clamping position shown in FIG. 3A.

The tandem embodiment of the invention as illustrated provides a number of advantages. The ability to clamp molds 10a, 10b on both sides of the moving platen 26, which itself effectively reduces the clamping cycle by half, also allows the stroke length of the pistons 50a, 50b to be shorter than in a conventional press 20. This reduces the clamping cycle even further and thus increases the speed and capacity of the press 20, but also allows the actuating cylinders 40a, 40b to occupy the space around the injection molding apparatus 2, requiring very little additional space for the overall apparatus.

Also, since the actuating cylinders 40a, 40b need only move the platen they can be designed to operate at higher speeds than conventional high pressure actuating cylinders, so most of the clamping cycle occurs at high speed. Moreover, since the moving platen 26 does not have to slide along any guide bar structure, the design of the platen 26 and the hydraulic cylinders 40 is considerably simplified, the need for a spider is eliminated and the durability of the connections between the platens is substantially increased.

Preferred embodiments of the invention having been thus described by way of example only, it will be apparent to those skilled in the art that certain modifications and adaptations may be made without departing from the scope of the invention, as set out in the appended claims. The invention is intended to include all such modifications and adaptations as fall within the scope of the appended claims.

We claim:

1. An actuator for actuating opposed first and second structures, the first and second structures being movable between an open position in which the first and second structures are spaced apart, and a closed position in which the first and second structures are disposed together, comprising:

at least one hydraulic actuating cylinder mounted to the first structure, having an inner end facing the second structure and an outer end, at least one hydraulic clamping cylinder mounted to the second structure, a piston extending out of both ends of the actuating cylinder, having a first portion providing a piston head disposed within the actuating cylinder and a second portion providing a piston head disposed within the clamping cylinder, and a piston lock for anchoring the piston, whereby the actuating cylinder can be actuated to move the first and second structures from the open position to the closed position, and when the piston is anchored in the closed position the clamping cylinder can be actuated to apply a clamping force between the first and second structures.

2. The actuator of claim 1 in which the clamping cylinder has a larger diameter than the actuating cylinder.

3. The actuator of claim 2 in which the piston lock comprises an enlargement at portion of the piston projecting beyond the outer end of the actuating cylinder.

4. The actuator of claim 3 in which the piston lock further comprises a spacer which in an anchoring position cooperates with the enlargement to substantially prevent the piston from extending toward the second structure.

5. The actuator of claim 1 in which the first structure is stationary and the second structure is movable.

6. The actuator of claim 5 for actuating a press, in which the first structure comprises a stationary frame comprising at least one stationary platen having a working face, and the second structure comprises a moving frame comprising a moving platen disposed in alignment with the stationary platen and having a working face in opposition to the working face of the stationary platen, the movable platen being movable toward and away from the stationary platen and in a clamping position applying a clamping force between the working face of the stationary platen and the working face of the moving platen.

7. The actuator of claim 6 in which the stationary frame comprises a first stationary platen having a working face and a second stationary platen having a working face disposed in opposition to the first stationary platen, each stationary platen and the moving frame comprises a moving platen disposed between the first and second stationary platens and in alignment therewith having a first working face in opposition to the working face of the first stationary platen and a second working face in opposition to the working face of the second stationary platen and movable between the first and second stationary platens so as to alternately apply a clamping force to the working face of the first stationary platen and to the working face of the second stationary platen in a clamping position.

8. The actuator of claim 7 in which each stationary platen has mounted thereto a hydraulic actuating cylinder having open ends, wherein the actuator comprises a piston rod disposed through each of the actuating cylinders, each piston rod having a piston head disposed within the respective actuating cylinder and a piston head disposed within the clamping cylinder, an end of each piston extending out of the outer end of the respective actuating cylinder and comprising an enlargement for anchoring the piston rod in the clamping position, whereby actuating the clamping cylinder when the piston rod is anchored applies a clamping force between the moving platen and one of the stationary platens.

9. The actuator of claim 1 in which the piston head disposed within the actuating cylinder comprises a bearing surface formed in the piston rod.

10. The actuator of claim 8 in which the piston rods are engaged to the same piston head within the clamping cylinder.

11. The actuator of claim 6 in which a plurality of actuating cylinders are mounted about the stationary platen for respectively actuating a plurality of pistons disposed within the actuating cylinders and engaged to piston heads disposed within hydraulic clamping cylinders mounted to the moving platen.

12. A method of clamping opposed first and second structures movable between an open position in which the first and second structures are spaced apart and a closed position in which the first and second structures are disposed together, by a piston extending out of ends of an actuating cylinder mounted to the first structure and having a first portion providing a piston head disposed within the actuating cylinder and a second portion providing a piston head disposed within a clamping cylinder mounted to the second structure, the actuating cylinder having an inner end facing the second structure and an outer end, the method comprising the steps of:

a. actuating the actuating cylinder to draw the second structure toward the first structure, b. anchoring the piston, and c. actuating the clamping cylinder to clamp the second structure to the first structure.

13. The method of claim 12 in which the clamping cylinder has a larger diameter than the actuating cylinder.

14. The method of claim 12 in which the piston is anchored by a piston lock comprising an enlargement at a portion of the piston projecting beyond the outer end of the actuating cylinder.

15. The method of claim 14 in which the step of anchoring the piston further comprises the step of blocking movement of the enlargement to substantially prevent the piston from extending toward the second structure.

16. The method of claim 12 in which the first structure is stationary and the second structure is movable.

17. The method of claim 13 for actuating a press, in which the first structure comprises a stationary frame comprising at least one stationary platen having a working face, and the second structure comprises a moving frame comprising a moving platen disposed in alignment with the stationary platen and having a working face in opposition to the working face of the stationary platen, the movable platen being movable toward and away from the stationary platen and in a clamping position applying a clamping force between the working face of the stationary platen and the working face of the moving platen.

18. The method of claim 17 in which the stationary frame comprises a first stationary platen having a working face and a second stationary platen having a working face disposed in opposition to the first stationary platen, each stationary platen and the moving frame comprises a moving platen disposed between the first and second stationary platens and in alignment therewith having a first working face in opposition to the working face of the first stationary platen and a second working face in opposition to the working face of the second stationary platen and movable between the first and second stationary platens so as to alternately apply a clamping force to the working face of the first stationary platen and to the working face of the second stationary platen in a clamping position.

19. The method of claim 18 in which the piston rods are engaged to the same piston head within the clamping cylinder.

20. The method of claim 17 in which a plurality of actuating cylinders are mounted about the stationary platen for respectively actuating a plurality of pistons disposed within the actuating cylinders and engaged to piston heads disposed within hydraulic clamping cylinders mounted to the moving platen.

\* \* \* \* \*